United States Patent
Tomka et al.

(10) Patent No.: US 6,910,384 B2
(45) Date of Patent: Jun. 28, 2005

(54) STRESS OR MAGNETIC FIELD SENSOR WITH SPATIALLY VARYING BIAS

(75) Inventors: George Jiri Tomka, Farnborough (GB); Jonathan Geoffrey Gore, Farnborough (GB); Mark Gregory Maylin, Farnborough (GB); James Carl Milne, Farnborough (GB)

(73) Assignee: QuinetiQ Limited (GB)

( * ) Notice: Subject to any disclaimer, the term of this patent is extended or adjusted under 35 U.S.C. 154(b) by 0 days.

(21) Appl. No.: 10/472,601

(22) PCT Filed: Mar. 20, 2002

(86) PCT No.: PCT/GB02/01298

§ 371 (c)(1),
(2), (4) Date: Sep. 22, 2003

(87) PCT Pub. No.: WO02/077591

PCT Pub. Date: Oct. 3, 2002

(65) Prior Publication Data

US 2004/0103725 A1 Jun. 3, 2004

(30) Foreign Application Priority Data

Mar. 22, 2001 (GB) .............................................. 0107182

(51) Int. Cl.$^7$ ................................................ G01B 7/16
(52) U.S. Cl. ....................................................... 73/779
(58) Field of Search ............................. 73/779, 862.69, 73/862.193

(56) References Cited

U.S. PATENT DOCUMENTS

| | | | |
|---|---|---|---|
| 4,119,911 A | | 10/1978 | Johnson |
| 4,782,705 A | * | 11/1988 | Hoffmann et al. ............. 73/776 |
| 4,812,758 A | * | 3/1989 | Yamashita et al. ........... 324/209 |
| 4,924,711 A | * | 5/1990 | Reilly ................... 73/862.046 |
| 5,600,239 A | | 2/1997 | Hathaway et al. |
| 5,650,570 A | | 7/1997 | Goto |
| 6,639,402 B2 | * | 10/2003 | Grimes et al. ............... 324/239 |

FOREIGN PATENT DOCUMENTS

| | | |
|---|---|---|
| EP | 0 989 394 | 3/2000 |
| WO | WO 00/03260 | 1/2000 |
| WO | WO 00/57147 | 3/2000 |

OTHER PUBLICATIONS

Gore et al., "Properties of Giant magneto–Impedance Material for a Novel Integrating Magnetic Sensor", *Mat. Res. Symp. Proc.* vol. 577, pp. 449–504 (1999).

Cobeno et al., "Magnetoelastic Sensor based on GMI of Amorphous Microwire", *Sensors and Actuators* A91, pp. 95–98 (2001).

Panina et al. "Magneto–Impedance Effect in Amorphous Wires", *Appl. Phys. Lett.* 65 pp. 1189–1191 (1994).

International Search Report from the European Patent Office for Application No. PCT/GB02/01298.

* cited by examiner

*Primary Examiner*—Max Noori
(74) *Attorney, Agent, or Firm*—McDonnell Boehnen Hulbert & Berghoff LLP (57) ABSTRACT

A stress or magnetic field sensor comprising a generally elongate magnetically soft amorphous or nanocrystalline electrically resistive element and biasing means for applying to the element a bias magnetic field of which the component directed along the length of the sensor has an amplitude variation pattern along the element. A periodically varying pattern has the effect of reducing the sensitivity of a stress sensor to external ambient fields (FIG. 3 shows that with a sawtooth bias field the sensitive portions a of a sensor move to positions b in the presence of an ambient field, but their number remains the same). A ramped bias field enables the position of the sensitive region of the sensor to be controlled, for measuring local stress, or for mapping an external magnetic field. Control of the regions where the sensor is active may include selective conductive coating of portions of its length. Potential uses of the stress sensor include a pressure sensor, embedment in moving parts (using rf communication) such as vehicle tyres, aircraft wings or machine parts, and in structures such as bridges where stray magnetic fields are a problem.

42 Claims, 6 Drawing Sheets

STRESS OR MAGNETIC FIELD SENSOR WITH SPATIALLY VARYING BIAS

This application is a 371 of PCT/GB02/01298 dated Mar. 20, 2002.

The present invention relates to the measurement of stress using magnetic stress impedance sensors.

Of the many methods for measuring stress that are known in the prior art, few or none fulfil all the requirements of low cost, high robustness and high sensitivity which are the ideal for many applications. Additional constraints may arise when it is also required that the stress to be measured is in a moving part.

Highly sensitive sensors have been developed which employ soft magnetic materials, for example in the form of negative magnetostrictive amorphous or nanocrystalline melt-spun wires and ribbons, and which are based on the GMI effect.

When an ac drive current is passed through a magnetically soft (normally amorphous or nanocrystalline) electrically resistive conductor, e.g. a wire, ribbon or fibre, the ac voltage thereby developed is highly sensitive to the presence or application of an external magnetic field, particularly when the drive current frequency is greater than 100 kHz, the effect being known as the Giant Magneto-Impedance Effect (GMI). The change in voltage is understood as being a consequence of the dependence of the skin depth of the conductor on the magnetic permeability. Interpretation of the GMI effect was introduced in 1994 simultaneously by Panina and Mohri Appl. Phys. Lett. 65 (1994) 1189 and Beach and Berkowitz Appl. Phys. Lett. 64 (1994) 3652.

Since the GMI effect can occur in long wires or ribbons, it is possible to detect the integrated magnetic field along the path of the wire or ribbon by using the appropriate hardware, as described in our copending UK patent application GB 9814848.9 filed Jul. 9, 1998, and derived International Patent Application WO 99/01967 and European Patent Application 99926653.9. The external magnetic field to be measured may be temporally invariant, but where it varies with time it is to be expected that the ac impedance will show a corresponding variation.

The emphasis in the aforesaid patent application is the application of a uniform bias field (see for example FIG. 6 of the application) to enable integration of the external field to be measured along the length of a GMI material. By contrast, as will be described hereafter, in the sensor of the present invention a non-uniform bias field is deliberately applied to the GMI material. The effect is dependent upon the component of the field which lies along the length of the sensor, and it should be understood that the non-uniformity of the bias field must correspondingly be a non-uniformity of amplitude as measured along the longitudinal axis of the sensor.

Furthermore, because of the inverse magnetostriction effect in such materials, the strong skin effect causes the impedance of the sensing element (the electrically resistive conductor) to change with applied stress S, this effect being termed the Giant Stress-Impedance effect (GSI). The physical mechanism of the impedance change is believed to substantially avoid cross-talk problems between orthogonal components of the stress tensor such as can arise with conventional strain gauges, for example.

It has been found that the optimal drive frequency, i.e. the frequency of the applied ac current, for GMI and GSI sensors lies in the MHz region, which permits relatively easy integration into an rf (radio frequency) communication system, for example for simple interfacing with a passive rf tag system. In turn this facilitates remote sensing of stress or related factors in moving parts. Since it has also been found that such sensors have only a low power requirement for satisfactory operation, commonly as little as a few microwatts, it is possible to locate a sensor element within a matrix, for example of plastics or elastic material, for remote interrogation with no external leads or other attachments.

The rf system may be any known system for sensing impedance changes in the sensor element. For example, the wire may form part of a resonant circuit which changes its resonant frequency as the impedance of the sensor element changes. Alternatively the sensor element could be incorporated into a balance bridge providing a frequency modulated output rf signal.

Furthermore, the rf system could simply be a wire itself, which on its own can be both as sensor and antenna, as in International Patent Application No. PCT/SE00/00476 (Tyren et al) published under serial number WO 00/57147. In this sensor a temporally variant rf magnetic field (referred to as a magnetic sinewave bias field when the sensor is magnetically driven), which interacts with the magnetic moments within the GMI/GSI material, is used both as a magnetic excitation for the sensor and also as a communication medium in that variations in the return excitation signal can be measured as an indication of the ac impedance of the wire, and hence stress in the wire. While the present invention will require some means of sensing the impedance variation in a GMI or GSI element, and while this could be effected by any of the foregoing means, it is primarily concerned with the provision of a bias field which varies along the sensor. As will be explained later, such a bias field makes regions of the sensor more or less sensitive according to position.

Figure 1:
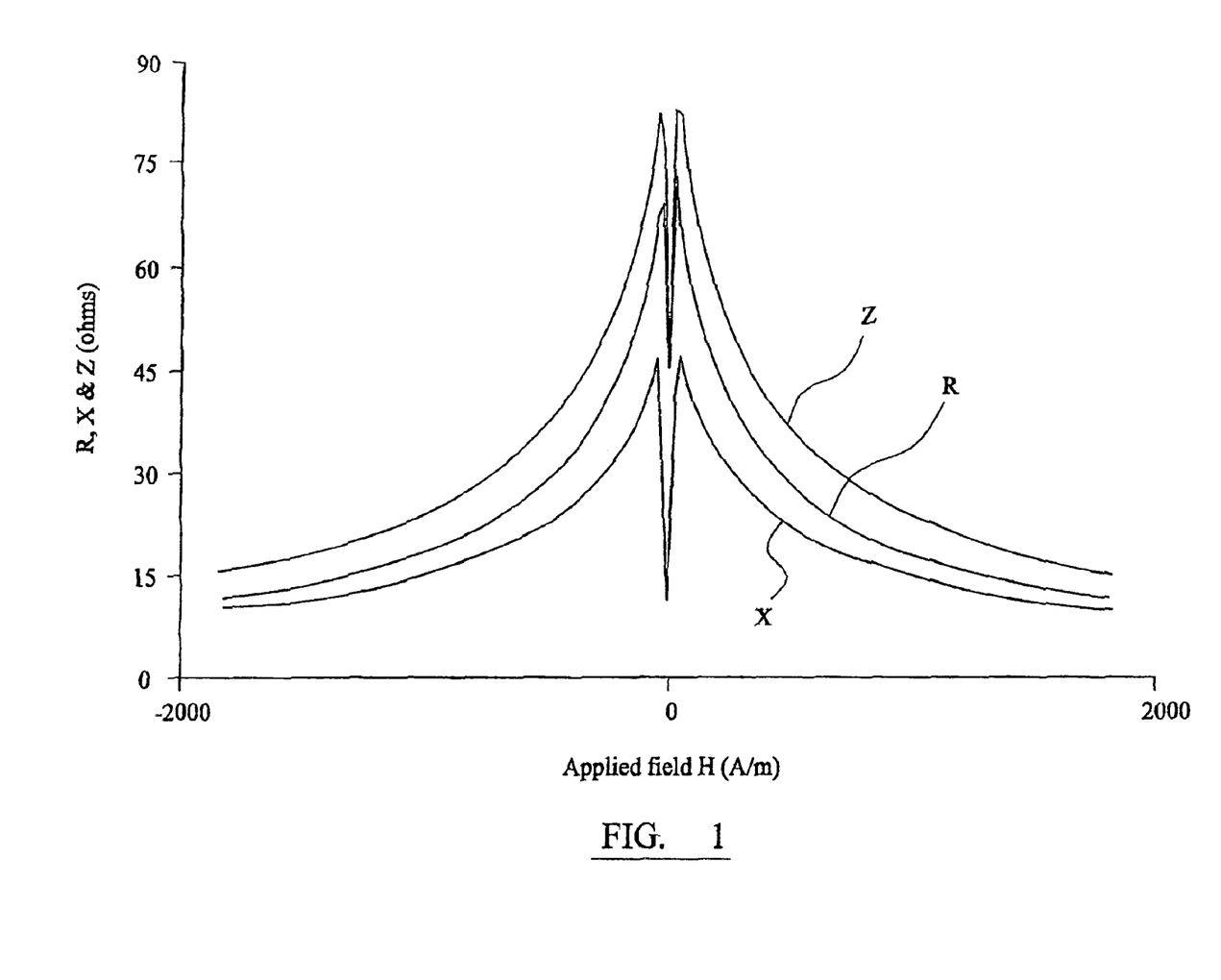
FIG. 1 shows in schematic form the characteristic variation in impedance of a GSI element in the form of a wire of $(Co_{0.94}Fe_{0.06})_{72.5}Si_{12.5}B_{15}$ (10 cm in length and 125 µm in diameter.

FIG. 1 is a schematic indication as to how the complex impedance Z (consisting of reactance X and impedance R) of a sensor wire element consisting of a 10 cm length of $(Co_{0.94}Fe_{0.06})_{72.5} Si_{12.5}B_{15}$ (diameter of 125 $\mu$m) alters with the applied magnetic field (H) and it will be seen that there is a very marked increase in impedance whenever a finite magnetic field is present. It will also be seen that the response is independent of direction of the field along the element, that the region of greatest sensitivity (rate of change of impedance with field) is associated with the zero field position, and that the sensitivity falls as the magnetic field increases. Hereafter this region will be termed the "sensitive location". However, precisely because such sensors are so very sensitive to magnetic fields, including stray magnetic fields that commonly occur in stress measuring environments, applications thereof have heretofore been limited or impractical.

Figure 2:
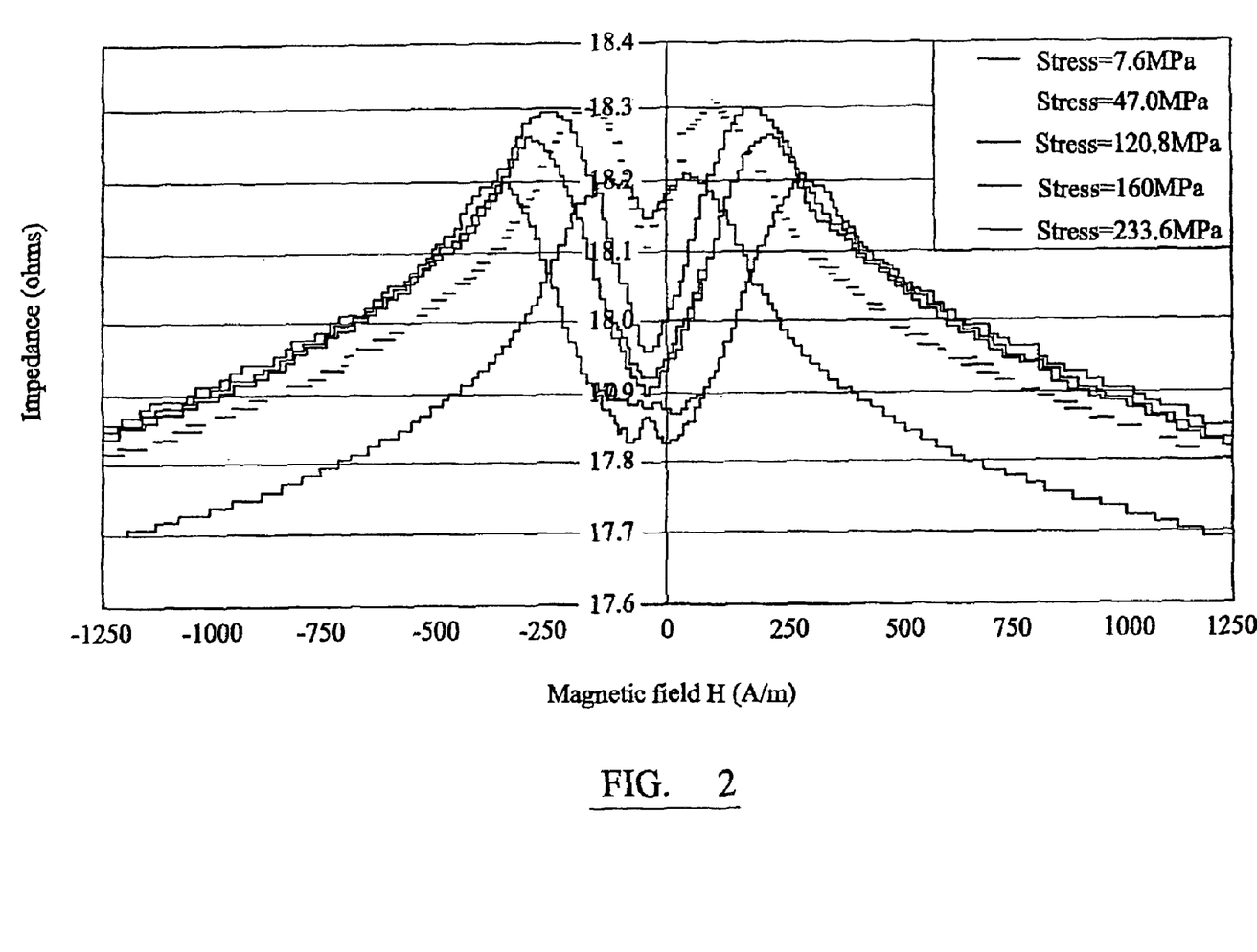
FIG. 2 shows in schematic form the characteristic variation in impedance of a GSI element in the form of a Co-based amorphous ribbon, 20 mm long, 1 mm wide and 20 µm thick, the exact composition of which is unknown, under various levels of applied stress.

The latter point is illustrated in FIG. 2, which shows in schematic form the characteristic variation in impedance of a GSI element in the form of a Co-based amorphous ribbon, 20 mm long, 1 mm wide and 20 $\mu$m thick, the exact composition being unknown, under various levels of applied stress. While it will be appreciated that the impedance is markedly affected by the applied stress level, particularly at low levels of applied magnetic field, it will again be seen that variations in applied magnetic field also have a large influence on impedance, thereby rendering the measurement of stress by such a sensor unreliable. It should be noted that magnetic field refers throughout to the field component parallel to the length of the wire. Effects of the field component perpendicular to the wire tend to be negligible due to the large demagnetising effects in that direction.

The present invention provides a sensor comprising a generally elongate magnetically soft amorphous or nanocrystalline electrically resistive element and biasing means for applying to the element a bias magnetic field, the component of said field directed along the length of the sensor having a spatially varying amplitude pattern along the element. Normally the sensor element will be of an amorphous or nanocrystalline metal or alloy. The invention extends to a sensing device, a sensing arrangement, a method of reducing the sensitivity of the impedance of a stress sensor element to magnetic fields, and a method of measuring stress in an object.

Figure 3:
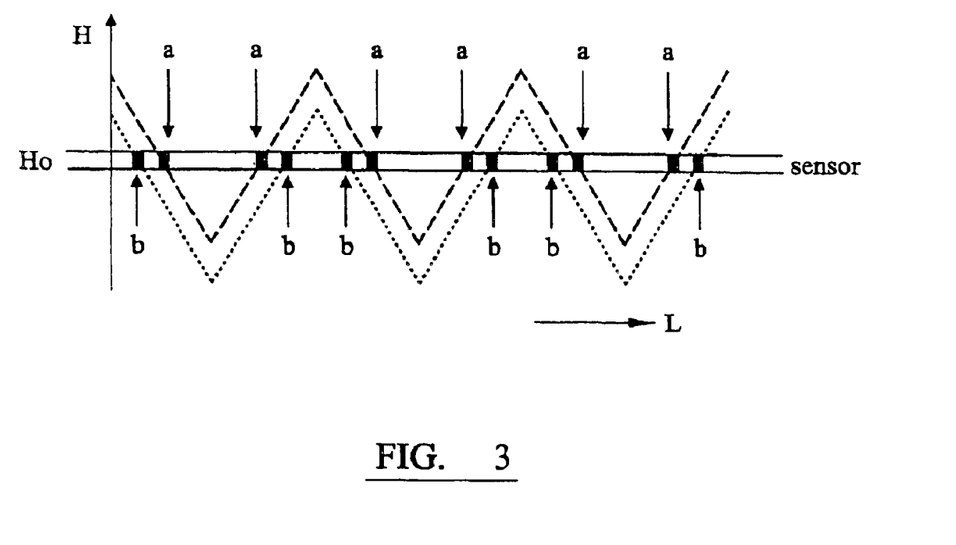
FIG. 3 illustrates in schematic form the desensitising effect of a sawtooth bias field.

In one embodiment of the invention the bias field is arranged to reduce the effect of external ambient magnetic fields on the sensor response. In such a case, it is believed that the effect of applying the bias field to the sensor element is to average out the GMI/GSI response to provide a flat, or flatter, magnetic field insensitive response. While not wishing to be bound by any theory, this is shown schematically in FIG. 3 where effective field H is plotted along the length L of the sensor for a bias field along the element having an amplitude which varies in a sawtooth manner along the element. In the absence of any other magnetic field the sawtooth is symmetrically located about a zero field line Ho as shown by dashed line, and sensitive locations a of the sensor occur each time the dashed line intercepts the zero field line Ho. In the presence of an additional ambient field directed along the element the sawtooth is shifted as shown by the dotted line, and the sensitive locations are shifted along the sensor to locations b. However the number of sensitive locations remains the same, and accordingly the response of the sensor is insensitive to the presence of the ambient field, relative to the case where the sawtooth bias is absent. Such an arrangement can be used to measure stress.

Care should be taken that the bias is not so strong as to make the impedance response insensitive to stress as well as to stray magnetic fields, and in this respect it has been found that it is possible to control the stress sensitivity and magnetic field sensitivity by controlling the form and intensity of the bias magnetic field applied to the sensor element. It will be understood that the optimum form of bias field will depend on requirements for linearity of response, the expected magnitude of stray fields in use for the application in hand, and on the manner in which impedance Z depends on magnetic field H and stress S.

Figure 4:
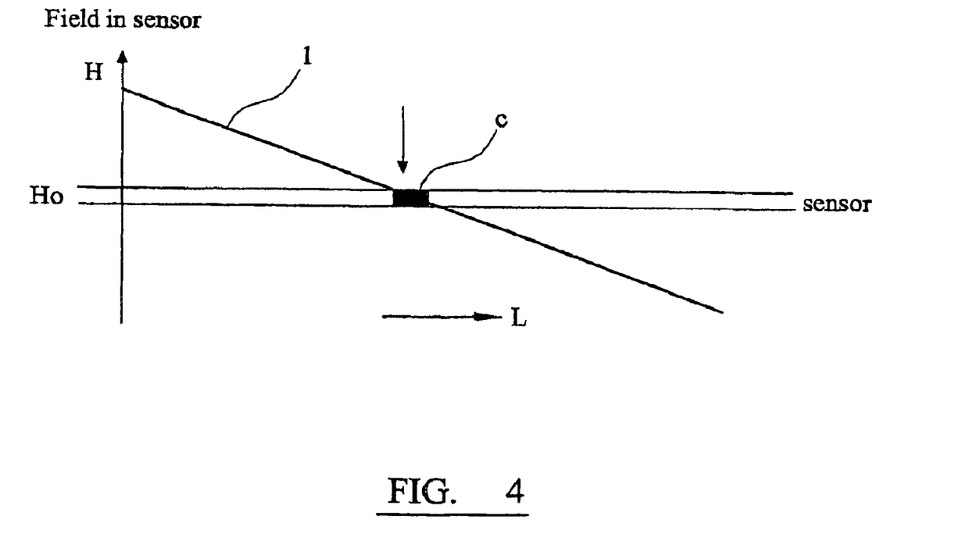
FIG. 4 illustrates in schematic form the use of a ramped bias field to control the position where a sensor is sensitive.

In the foregoing arrangement, in which the sensitive locations of the sensor vary with external ambient field but the number of sensitive regions remains constant, the exact position of the sensitive regions tends to be immaterial. In other embodiments, however, the bias field is arranged so as to control the location of a sensitive position or positions of the sensor. This is shown schematically in FIG. 4 where the amplitude of the bias field 1 measured along the element is ramped along the sensor length L to provide a single sensitive location c. In the absence of any external ambient field, the dc component of the bias field can be altered to displace the sensitive location c, enabling stress to be measured locally at the location c. Alternatively, using a symmetrical bias field as shown, the location c is indicative of the magnitude of any external ambient field. This may be developed into a method of detecting or mapping ambient fields, as will be explained later. Clearly the bias field pattern could be such as to provide two or more sensitive locations simultaneously.

In one preferred embodiment of sensor the amplitude of the axial component of the bias magnetic field (the "pattern") varies periodically along the element. One preferred variation is sinusoidal, but alternative patterns could be used as appropriate, including sawtooth (single or double ramp) and stepped patterns, or approximations thereto.

In zero external field a sinusoidal pattern puts relatively more of the sensor element into a high biased state (near A) than would a linear pattern (i.e. ramp, saw tooth or triangular configuration).

This means that when an external reverse field (approaching -A along the element) is applied to a sinusoidally biased system, the total amount of sensor element near a net-zero-field (high sensitivity state) is higher for a sinusoidal bias field than when a linear bias field is used, resulting in a peak in the response to external field for a sinusoidal bias field, rather than the flatter response which would be obtained for the linear bias field.

This is only true if the GMI response is small or relatively flat at net fields of around A, for more complex high field responses a more complex bias is required and preferred.

In another embodiment of the invention the bias field is not periodic. It may, for example, take the form of a linear or non-linear ramp.

The bias field (or at least the aforesaid pattern) may be predetermined and time invariant. For example, the aforementioned sinusoidal field pattern may be applied by a magnetically loaded flexible mat, e.g. of rubber, located adjacent the sensor element, and of approximately the same length. The field pattern can be varied by the use of specifically designed magnetiser fixtures. In one embodiment, the mat was loaded with a SmCo-based magnetic filler, because its Curie temperature allows operation of the sensor under relatively high temperature conditions. Another embodiment utilises lower cost NdFeB-based magnetic filler when such high temperatures are not required.

Alternative ways of applying a fixed bias field include the use of magnetic or superconducting materials, magnetic coatings or cores, and solenoid systems. Another way of applying the bias field is to make intrinsic use of the magnetic properties of the sensing element. For example at the core of the amorphous or nanocrystalline wires there is a different domain configuration from the shell of the wire which could provide an intrinsic biasing field which varies in amplitude along the element. An example of such a material would be $Fe_{69.5}Cr_4Si_{7.5}B_{15}$ to which FIG. 5 relates.

However, it is also possible to apply a bias field where the pattern can be varied. For example the pattern could be of a fixed functional form (e.g. sine wave, sawtooth, etc.) which is altered (for example swept) in amplitude (i.e. the pattern shape is retained but altered in magnitude—a temporal variation), and/or location along the sensor element (a spatial variation). Alternatively or additionally the pattern itself could be changed, i.e. a change in pattern other than merely by change in position along the element. Such changes include variations in the actual shape and/or changes in the average level of the amplitude, i.e. the addition of a spatially constant bias offset—for example the addition of a spatially constant bias to the field of FIG. 4 will enable the sensitive location c to be moved along the sensor element.

Variations in the bias field pattern can be effected for example by the appropriate use of solenoids. Changes in bias pattern can be used to facilitate the resolution of (magnetic field or) stress components along the sensor element. As mentioned above, when using a ramped bias pattern, the addition of a spatially constant bias pattern can produce movement of a sensitive location. A similar effect could be obtained by sweeping the existing pattern along the element, while altering the amplitude of the ramp, i.e. its slope, will control the length of the sensitive location. It will be understood that normally the rate of any change in the bias field needs to be low relative to the rate of measurement (c.f. Tyren above, where the applied field changes at a rate much greater than the rate of measurement).

Furthermore, by selectively coating regions of the sensor element with more highly conductive coatings, these regions are effectively short circuited (there is only a surface current at the frequencies employed), and play a much reduced or negligible part in the sensor operation. This means that only the stress S (or magnetic field H for GMI sensors) existing at uncoated regions will be included in the signal integration, thereby enabling the effect of certain undesirable local magnetic fields, including components of biasing fields, to be masked out as required.

From the foregoing considerations it should be clear that by suitably constructing and/or controlling the sensor, it is possible to measure stress or magnetic field at one or more restricted locations along the length of the sensor. This location or these locations can be predetermined, for example by a design feature such as a patterned conductive coating, or controllable, for example by variation of the applied bias magnetic field. Such a property is useful where it is desired to avoid the difficulties and expense of soldering together several distinct elements or sensors.

The material of the sensing element may be a cobalt rich amorphous alloy, for example of $Co_{72.5}Si_{12.5}B_{15}$. Other alloys containing traces of Mn, Fe, C, Nb, Ni, Cu, Mo and Cr can also be used. Other compositions include $Fe_{81}B_{13.5}Si_{3.5}C_2$, $Fe_{4.9}Co_{71.8}Nb_{0.8}Si_{7.5}B_{15}$, $Co_{80}B_{20}$, $Fe_{77.5}Si_{7.5}B_{15}$, $Ni_{80}Fe_{20}$, $Fe_{69.5}Cr_4Si_{7.5}B_{15}$, $(Co_{0.94}Fe_{0.06})_{72.5}Si_{12.5}B_{15}$ and $Fe_{73.5}Cu_1Si_{13.5}B_9$. Cobalt rich amorphous or nanocrystalline alloys have extremely high maximum tensile strength values typically of between 1 to 4 GPa, which means that they are very suitable for use where a robust sensor is required. They also have a high elastic modulus typically of around 100 GPa for a Co rich ribbon. In addition they exhibit high corrosion resistance.

Moreover, measurement on a CoSiB wire indicate that the sensor elements are generally insensitive to changes in temperature at least in the range 20 to 150° C., making them suitable for use in environments where significantly elevated temperatures are likely to be encountered. It will be appreciated that this is the case for measurements of stress in road tyres, inter alia.

The sensor element may be in the form of a wire, ribbon or fibre produced for example by melt spinning. Wire and ribbons are typically 10 to 125 microns thick (minimum dimension). In manufacture, quenching normally results from the melt spinning process, and residual stresses arising therefrom couple with the magnetostriction to hinder domain rotation and so reduce the GMI/GSI effect. It is therefore preferred to anneal the quenched product to increase the sensitivity of the sensor, for example by furnace annealing, pulse current annealing or direct current annealing.

The sensor may comprise a single sensor element. It is possible to embed such a sensor comprising a sensor element, e.g. in the form of a ribbon, wire or large (elongate) fibre within an electrically relatively insulating supporting matrix, and in such a case the sensor will be responsive to stresses applied to or transmitted through the matrix. By way of example, coupling to the sensor element may be inductive, capacitive or via embedded conductors.

A typical example would comprise a ribbon or wire embedded in a vehicle tyre for sensing stresses applied to the tyre when in use. It is commonly recognised that the tyre to ground contact patch is the area where it is desirable to be able to instantly sense where the frictional force available is approaching the lower limit necessary for traction. Knowledge of the stress-strain dynamics of the tyre close to the ground, coupled with a model of the dynamic behaviour of the vehicle in response to the contact patch forces would provide an almost instantaneous detection of the dangers associated with changes in the nature of the road surface, etc., such as incipient skids and aquaplaning, and might also provide information on tyre wear. A SAW sensor for such an application has been proposed in European Patent Application No. 99114450.2. However, it is considered that the elastic properties of the rubber/steel matrix will have a significant effect on the acoustic wave propagation, and render such sensing difficult to employ in practice.

Alternatively, the sensor may comprise a plurality of sensor elements, e.g. in the form of discrete wires or ribbons, or as fibres. Where the elements are sufficiently large, they may be coupled together as desired, for example two or more ribbons or wires in series to provide a larger sensor element. Such coupling may be by any suitable means such as by direct electrical contact, or by coupling with non-magnetic wires therebetween. Again the sensor elements may be embedded in an electrically relatively insulating supporting matrix if desired Where the sensor elements are relatively small, such as relatively short fibres, it may be preferable to support them in an electrically relatively insulating supporting matrix. Where there is no direct contact between the elements, the properties of the sensor are then determined by the matrix as a whole, and the bias means may be arranged to apply the bias field to the whole matrix. Preferably the individual elements have some degree of alignment along a preferred axis, but the matrix should still work as a sensor element even where the alignment is substantially random. Ordering may be accomplished by any known means, for example by preferential orientation brought about by the process of extruding the matrix material, or by the application of a magnetic field. Such fibres may have added benefits in terms of increasing the mechanical strength of the supporting composite.

Where the sensor element is embedded in a matrix, or comprises a matrix, typical matrix materials therefor are plastics (synthetic resins) and rubbers. Commonly, these types of matrix material are electrically insulating.

Nevertheless, it is possible to employ matrix materials which have a degree of conductivity provided this is significantly less than that of the magnetic sensor elements(s) at the electrical frequency of use. An insulating matrix material may be rendered electrically conductive by suitable loading with a conductive material, e.g. in fine particulate form. In such cases while the GSI effect will modify the impedance of the embedded fibre/wire/ribbon, this will then modify the impedance of the matrix as a whole, which will be sensed.

There are a number of examples of the use of the changing field at a magnetic sensor to enable displacement to be measured. An example is disclosed in U.S. Pat. No. 4,119,911 (Johnson) in which a permalloy sensor is used to measure field variations as magnets are moved to detect their motion. Permalloy is not normally a soft amorphous or nanocrystalline material, and does not show GMI or GSI effects. The present invention relates to application of varying bias fields to change the intrinsic properties of amorphous or nanocrystalline GMI and GSI materials.

Further features and advantages of the invention will become apparent upon consideration of the appended claims, to which the reader is referred, and upon a reading of the following description of an exemplary embodiment of the invention made with reference to the accompanying drawings, in which:

Figure 5:
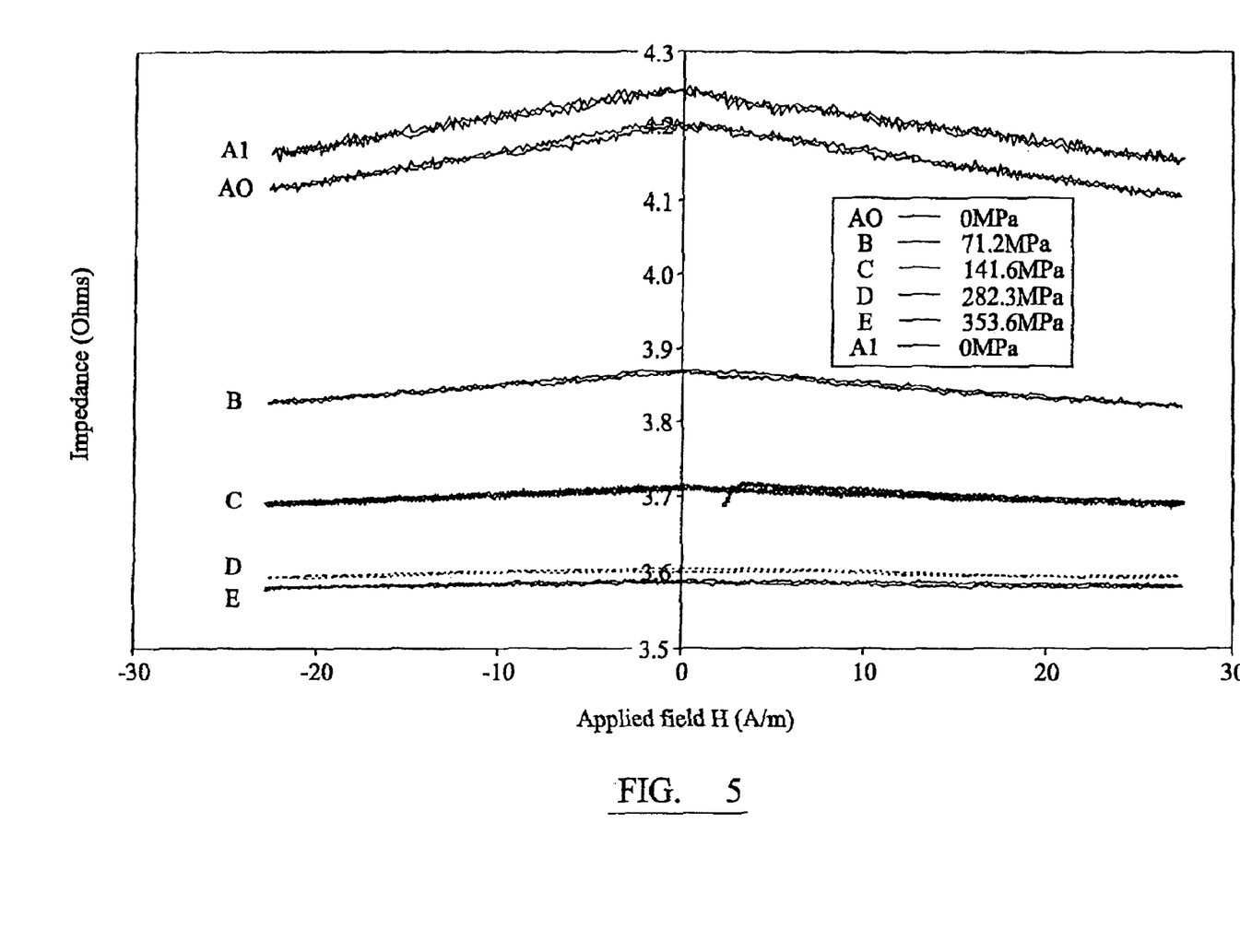
FIG. 5 shows the impedance response for a 20 mm length of a ribbon made from the material $Fe_{69.5}Cr_4Si_{7.5}B_{15}$ with a width of 1 mm and a thickness of 20 µm.

FIG. 5 shows that the response is relatively field insensitive without an externally applied bias field. It also shows that for generally equal increments of stress of around 71.2. MPa the differential response drops progressively, so that there is very little difference between responses shown in plots D and E. The plots A0 and A1 represent measurements taken before and after the other measurements, respectively.

Figure 6:
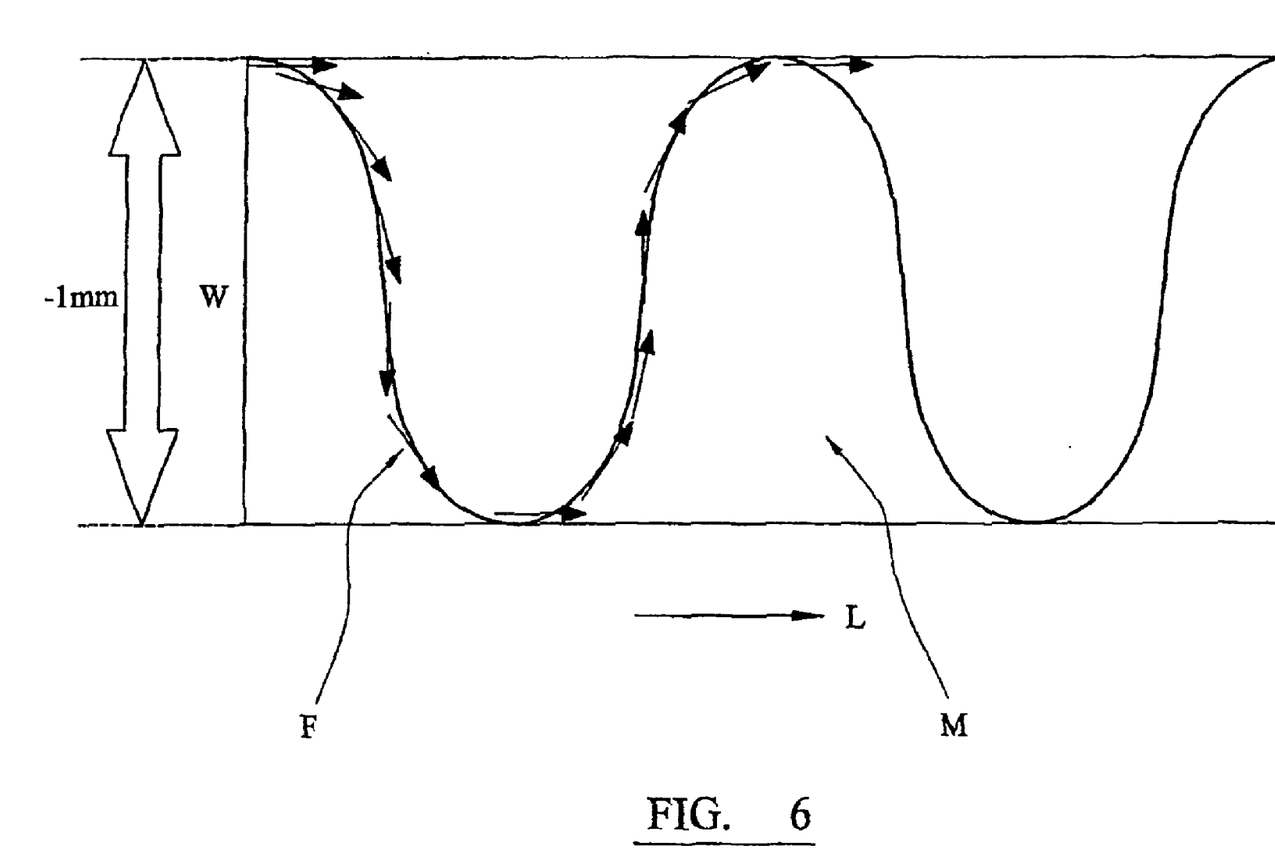
FIG. 6 schematically illustrates the field profile along the length of one form of biasing element for use in the invention.

A rubber mat loaded with NdFeB magnetic powder was rolled into a multi-turn cylinder and subjected to a diametric uniform magnetic field pulse from a Hirst Magnetiser system to produce when the mat M is straightened a magnetic intensity distribution (field profile) along the mat length L (width W). NdFeB is neodymium iron boron, a permanent magnetic material similar to SmCo. The resulting field profile F is schematically illustrated by the arrows in FIG. 6 for a two-turn cylinder, (i.e. 4 pole pitches, along a 25 mm long mat). The mat length will in general be chosen to substantially match the length of the resistive element with which it is to be used, which can be anything from a few microns to several metres, permitting either point or integral measurement of stress.

Figure 7:
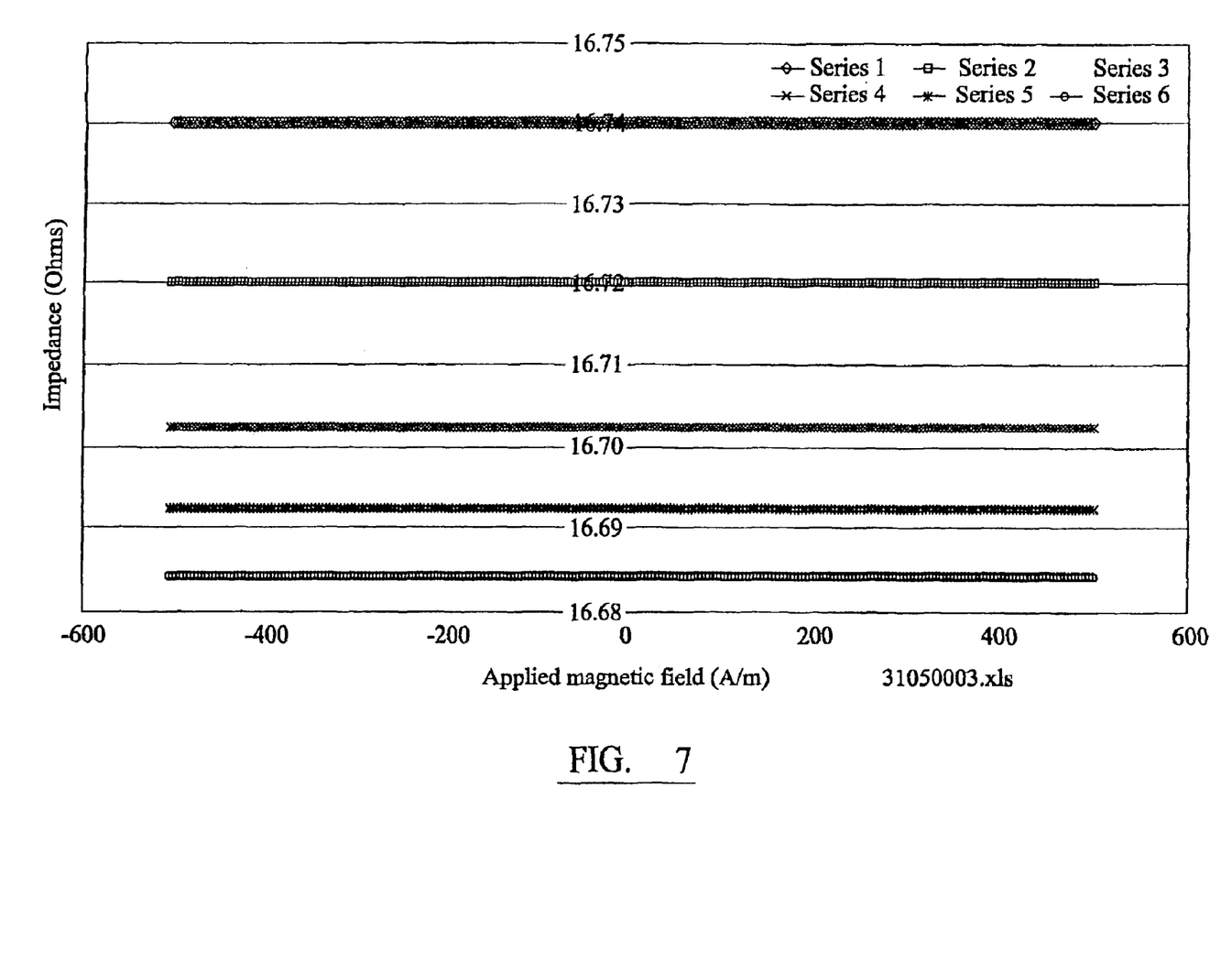
FIG. 7 illustrates the results obtained according to one embodiment of the invention in the form of a graph of variation of impedance level with applied magnetic field for different applied stress levels.

The straightened NdFeB loaded mat is placed adjacent to a 20 mm long FeCoSiB amorphous ribbon to produce a sensor according to the invention, and FIG. 7 shows in schematic form the impedance thereof at various stress levels as a function of an externally applied magnetic field. Each horizontal plot relates to one stress level. It will be seen that the presence of the biasing mat leads to a characteristic which varies with applied stress, but which is substantially independent of the level of the externally applied magnetic field.

While particular reference has been made to the measurement of stress in a vehicle tyre, it will be appreciated that there are other applications of the sensor of this invention, including the measurement of stress in aircraft wings and machine parts, including moving parts, and in the monitoring of stress levels in structures where stray magnetic fields constitute a problem, such as bridges where fields may be produced by moving vehicles. A pressure transducer, e.g. for use within a tyre, may comprise such a sensor.

What is claimed is:

1. A sensor comprising a generally elongate magnetically soft amorphous or nanocrystalline electrically resistive element adapted to exhibit a detectable change of property when exposed to a stress or magnetic filed to be sensed; a detector for detecting such change of property and biasing means for applying to the element a bias magnetic field, the component of said field directed along the length of the sensor having a spatially substantially varying pattern of amplitude along the element.

2. A sensor according to claim 1 wherein said pattern is predetermined.

3. A sensor according to claim 1 wherein the biasing means is controllable to effect change in said pattern.

4. A sensor according to claim 3 wherein said change is in the amplitude of the pattern.

5. A sensor according to claim 3 wherein said change is in the position of said pattern relative to the length of the element.

6. A sensor according to claim 3 wherein said change is in the pattern itself.

7. A sensor according to claim 1 wherein said amplitude variation is periodic.

8. A sensor according to claim 1 wherein said pattern includes substantially linear ramps, or approximations thereto.

9. A sensor according to claim 1 wherein said element has portions along its length coated with a highly conducting material.

10. A sensor according to claim 1 wherein said element is in the form of a wire, ribbon or fibre.

11. A sensor according to claim 1 wherein said element is melt spun.

12. A sensor according to claim 11 wherein said element is annealed after being melt spun.

13. A sensor according to claim 1 wherein said element exhibits a small negative magnetostriction.

14. A sensor according to claim 1 wherein said element exhibits a small positive magnetostriction.

15. A sensor according to claim 1 wherein the element is formed of a cobalt rich alloy.

16. A sensor according to claim 1 wherein the element is embedded in a matrix.

17. A sensor according to claim 1 wherein a plurality of said elements are embedded in a matrix.

18. A sensor according to claim 16 wherein said matrix is electrically insulating.

19. A sensing device comprising a sensor according to claim 1 and current supply means for supplying an alternating current to the element.

20. A device according to claim 19 wherein the alternating current frequency lies in the radio-frequency range.

21. A device according to claim 20 wherein the alternating current frequency is at least 100 kHz.

22. A device according to claim 21 wherein the alternating current frequency is at least 1 MHz.

23. A sensing device according to claim 19 wherein said current supply means is directly coupled to the sensor element.

24. A sensing device according to claim 19 wherein the current means is directly coupled to the element by inductive or capacitative or rf coupling.

25. A sensing arrangement comprising a device according to claim 19 and measuring means for measuring the alternating voltage generated in the element by the alternating current.

26. An arrangement according to claim 25 wherein the element forms part of a resonant circuit.

27. An arrangement according to claim 25 wherein the element forms part of a bridge circuit.

28. A method of reducing the sensitivity of the impedance of a generally elongate magnetically soft amorphous or nanocrystalline stress sensor element to external magnetic fields, the method comprising applying along the sensor element a bias magnetic field, the component of said field directed along the length of the sensor having a spatially substantially varying amplitude pattern along the element.

29. A method of measuring stress in an object by securing thereto a stress sensor comprising a generally elongate magnetically soft amorphous or nanocrystalline stress sensor element, supplying an ac current to the element, and measuring the impedance of the element, wherein a bias magnetic field is applied with an amplitude which varies with position along the element, the component of said field directed along the length of the sensor having a spatially substantially varying amplitude pattern along the element to reduce its sensitivity to external magnetic fields.

30. A method according to claim 28 wherein said pattern is predetermined.

31. A method according to claim 28 wherein said pattern is changed.

32. A method according to claim 28 wherein the magnitude of said pattern is changed.

33. A method according to claim 31 wherein the position of said pattern along the element is changed.

34. A method according to claim 29, wherein the object is a type, or part of a pressure transducer, or a part of a bridge, or a part of an aircraft, or an aircraft wing.

35. A tyre, or a pressure transducer within a tyre, having embedded therein a sensor according to claim 1.

36. A vehicle provide with a tyre according to claim 35 and having detecting means for detecting changes in the impedance of the sensor element.

37. A vehicle according to claim 36 wherein the detecting means is secured to a fixed part of the vehicle.

38. An aircraft having secured thereto a stress sensor according to claim 1.

39. An aircraft according to claim 38 wherein the sensor is secured to a wing.

40. A bridge having secured thereto a stress sensor according to claim 1.

41. A method of sensing stress applied to a flexible matrix material comprising embedding a sensor according to claim 1 in the matrix and measuring its impedance.

42. A method according to claim 41 wherein the matrix material is carcase of a tyre.

* * * * *

UNITED STATES PATENT AND TRADEMARK OFFICE
CERTIFICATE OF CORRECTION

PATENT NO. : 6,910,384 B2
DATED : June 28, 2005
INVENTOR(S) : Tomka et al.

It is certified that error appears in the above-identified patent and that said Letters Patent is hereby corrected as shown below:

<u>Title page,</u>
Item [73], Assignee, change "QuinetiQ Limited (GB)" and replace with -- QINETIQ LIMITED (GB) --.

Signed and Sealed this

Thirtieth Day of August, 2005

JON W. DUDAS
*Director of the United States Patent and Trademark Office*